United States Patent [19]

Hijikata et al.

[11] Patent Number: 5,264,516
[45] Date of Patent: Nov. 23, 1993

[54] SILICON CONTAINING POLYACETAL COPOLYMER AND MANUFACTURING METHOD THEREOF

[75] Inventors: Kenji Hijikata, Mishima; Toshio Nakane; Yukihiko Kageyama, both of Fuji, all of Japan

[73] Assignee: Polyplastics, Co., Ltd., Osaka, Japan

[21] Appl. No.: 928,657

[22] Filed: Aug. 17, 1992

Related U.S. Application Data

[63] Continuation of Ser. No. 506,532, Apr. 9, 1990, abandoned, which is a continuation of Ser. No. 212,629, Jun. 28, 1988, abandoned.

[30] Foreign Application Priority Data

Jul. 2, 1987 [JP] Japan ................. 62-166026

[51] Int. Cl.$^5$ .................. C08G 77/46; C08G 77/08
[52] U.S. Cl. ........................... 528/13; 528/25; 528/27
[58] Field of Search ............... 528/25, 27, 13

[56] References Cited

U.S. PATENT DOCUMENTS

| | | | |
|---|---|---|---|
| 3,491,048 | 1/1970 | Sargent | 260/29.1 |
| 3,661,854 | 5/1972 | Setterquist | 528/25 |

FOREIGN PATENT DOCUMENTS

| | | | |
|---|---|---|---|
| 0146995 | 7/1985 | European Pat. Off. | |
| 1919609 | 11/1969 | Fed. Rep. of Germany | 528/25 |
| 1475411 | 3/1967 | France | 528/25 |
| 1579410 | 7/1969 | France | |
| 58-174412 | 10/1983 | Japan | 528/25 |
| 58-179215 | 10/1983 | Japan | 528/25 |

OTHER PUBLICATIONS

Patent Abstracts of Japan, vol. 8, No. 7 (C-204) (1444), Jan. 12, 1984.
Patent Abstracts of Japan, vol. 9, No. 211 (C-300) (1934) Aug. 29, 1985.

*Primary Examiner*—Ralph H. Dean, Jr.
*Attorney, Agent, or Firm*—Nixon & Vanderhye

[57] ABSTRACT

A silicon-containing polyacetal copolymer comprises silicone oil units having the formula (A) and polyacetal units:

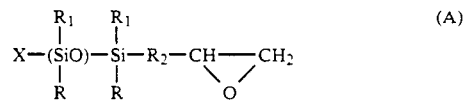

where $R_1$ is an alkyl or phenyl group; $R_2$ is a divalent organic group; X is a group selected from among $-NH_2$, $-OH$,

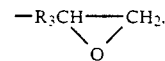

$-R_4OH$, $-R_5COOH$, $-R_6COOR_7$, $-R_8$ and $OR_9$, where $R_3$ is a divalent organic group, $R_4 \sim R_6$ are alkylene groups having 1 to 10 carbon atoms, $R_7 \sim R_9$ alkyl groups having 1 to 10 carbon atoms $1 \sim 10$, and n is a number between $5 \sim 1000$.

6 Claims, No Drawings

SILICON CONTAINING POLYACETAL COPOLYMER AND MANUFACTURING METHOD THEREOF

This is a continuation of application Ser. No. 07/506,532, filed Apr. 9, 1990, now abandoned, which in turn is a continuation of application Ser. No. 07/212.629, filed Jun. 28, 1988 (now abandoned).

The present invention relates to a copolymer or a novel silicon containing polyacetal polymer which has excellent impact, water and wear resistance, and to a manufacturing method thereof.

STATEMENT OF PRIOR ART

Polyacetal resin is becoming more widely utilized as a thermoplastic resin due to its excellent mechanical properties such as strength, modulus of elasticity, frictional characteristics.

These resins have excellent chemical and thermal properties and mechanical strength, but attaining the improvement of these properties through compounding, chemical structural improvements, etc., by way of copolymerization, etc., are still under development, with a view to further improving the aforementioned properties.

There is available, for example, a method for introducing various functional groups into the terminals of silicone oil (Japanese Patent Application Laid-Open Nos. Sho 59-33352 and 60-424497) for the enhancement of the compounds compatibility with this resin. When mixing the resin with the silicone oil which has been subjected to terminal treatment for the purpose of achieving further improvement in frictional characteristics; however, the effect of improving the resin's compatibility with such a nonpolar material as silicone oil, etc., is not still sufficient.

In this situation, attempts have been made to improve the polyacetal's compatibility with silicone oil, with silicone oil bonded to its terminal(s), using silicone oil as a molecular weight adjuster when polymerizing polyacetal (Japanese Patent Application Laid-Open Nos. Sho 58-174412, 58-179215 and 60-76523). For example, Japanese Patent Application Laid-Open No. Sho 58-174412 discloses a method of adding

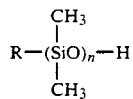

(R represents an alkyl group) as a molecular adjuster, when making polymerication of polyacetal, and Japanese Patent Application Laid-Open No. Sho 58-179215 discloses a method of adding

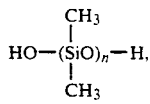

respectively.

In all of these instances, however, it is difficult to obtain highly polymerized products; thus, the physical properties which this resin intrinsically possesses are greatly sacrificed.

SUMMARY OF THE INVENTION

The present inventors surprisingly have discovered that by introducing a particular siloxane's soft segment into the polyacetal polymer by way of covalent bond, the impact resistance and frictional characteristics are further improved and a hydrophobic property is provided (which results in further reduction of water absorbency) with very little loss of the excellent characteristics attributable to the base polymer. Thus, copolymers with substantial practical utility result.

Since the terminal reactive silicone oil (A) which is used according to this invention acts as a copolymerizing comonomer, not as a molecular weight adjuster for polymerization of polyacetal, its use permits introduction of the siloxane segment without reducing the molecular weight of the block copolymer formed, thereby providing a polyacetal copolymer with improved lubricity, water absorbency, etc., while maintaining the original characteristics of the polyacetal resin.

The invention relates to a silicon-containing polyacetal copolymer comprising 0.001 to 50 percent by weight of a silicon oil unit having a reactive terminal group and the following formula (A), and 50 to 99.999 percent by weight of a polyacetal segment, which through covalent bonding, has a polymerization degree (n in the formula (A) of 5–1000 for its siloxane segment and 5–2000 for its polyacetal segment. The formula (A) can be represented as:

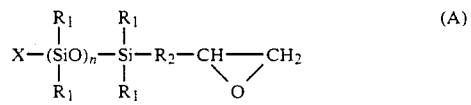

wherein $R_1$ denotes an alkyl or a phenyl group; $R_2$, a divalent organic group; X, a group selected from among $-NH_2$, $-OH$,

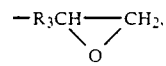

$R_4OH$, $-R_5COOH$, $-R_6COOR_7$, $-R_8$ and $-OR_9$, with $R_3$ being a divalent organic group, $R_4 \sim R_6$ being alkylene groups with 1-10 carbon atoms, $R_7 \sim R_9$ being alkyl groups with 1-10 carbon atoms and n being a number ranging from $5 \sim 1,000$). The invention also relates to the manufacturing method of the silicon-containing polyacetal copolymer.

The silicon-containing polyacetal copolymer of the invention can be obtained by binding the silicone oil and the polyacetal by way of covalent bonding. The formula (A) is defined above. It is preferable that $R_1$ is an alkyl having 1 to 6 carbon atoms or phenyl; $R_2$ and $R_3$ each are alkylenes having 1 to 3,000 carbon atoms, an oxyalkylene having 1 to 6 carbon atoms, a polyoxyalkylene having 1 to 3,000 carbon atoms, an alkylene ester group having 1 to 10 carbon atoms, an alkylene sulfide having 1 to 10 carbon atoms, or an alkyleneamide having 1 to 10 carbon atoms.

The polyacetal segment, as herein designated, has polyoxymethylene as its main skeleton and is a homopolymer (which is formed by polymerization of either formaldehyde or trioxane) or a copolymer (composed of either formaldehyde or trioxane as its main component) and one or two or more members of comonomers selected from among cyclic ethers or cyclic formals such as ethylene oxide, propylene oxide, oxetane, dioxorane, dioxepane, trioxepane and butanediol formaly.

For manufacturing such a silicon containing polyacetal copolymer, one may employ a method in which more than at least 0.001% by weight of terminal reactive silicone oil represented by the general formula (A) in proportion to totally reactive monomers and either formaldehyde or trioxane are copolymerized by heating, in the presence of a catalyzer, according to the generally well-known polyacetal polymerization method, or a method in which either formaldehyde or trioxane as the main component, one or two or more members of comonomers selected from among cyclic ethers or cyclic formals such as ethylene oxide, propylene oxide, oxetane, dioxorane, dioxepane, trioxepane, butanediol formal, etc., and terminal reactive silicone oil (A) are copolymerized by heating in the presence of a catalyzer. And, as a material for supplying formaldehyde, paraformaldehyde may be used.

The terminal reactive silicone oil used according to this invention is a material represented by the aforementioned general formula (A). However, use of mixtures of more than two members of such a material is permissible.

When groups other than

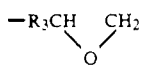

are used as X in the general formula (A), the copolymers obtained will be block copolymers or comb-shape graft copolymers.

An when X is

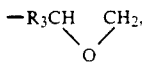

or when the silicone oil has glycidyl groups at both terminals, a graft copolymer formed by cross-linking polyacetal segments with siloxane segments will be obtained. Particularly desirable materials are polydimethyl siloxane diglycidyls represented by the formula (A) in which $R_1$ represents a methyl group, and $R_2$ and $R_3$ are $-CH_2-$, $-OCH_2-$, $-CH_2CH_2CH_2OCH_2-$, etc., with their polymerization degree from 5 to 1000 (preferably from 10 to 500).

The ratio by weight of the aforementioned terminal reactive silicone oil to the monomers composing the polyacetal segment should be $0.001 \sim 50:99.999 \sim 50$, and, preferably, $0.005 \sim 30:99.995 \sim 70$.

In the manufacturing method of the silicon-containing polyacetal copolymer of this invention, the polymerization should be performed in compliance with the generally well-known polyacetal manufacturing conditions and by using a similar catalyzer.

A particularly preferable working mode utilizes trioxane as the main monomer, a small amount of cyclic ether or cyclic formal as a comonomer and, further, polydimethyl siloxane glycidyl ether added thereto and reacted at a temperature between $60^\circ \sim 150^\circ$ C., using a cation active catalyzer such as trifluoroboron or its complexes, etc.

And, in manufacturing the silicon containing polyacetal copolymer, a well-known polymerization degree adjuster as dimethyl acetal may be added without departing from the spirit of this invention.

The resulting silicon containing polyacetal copolymer of this invention is a highly polymerized product having a siloxane segment and polyacetal polymer bound by covalent bonding. The resulting polymer is a novel copolymer having excellent impact and water resistance, lubricity and wear resistance characteristic and, therefore, particularly useful in the automobile field, electric and electronic parts field, and any application which involves exposure to a harsh working environment involving high temperatures, high humidities, etc.

The invention will be further illustrated by way of the following examples and embodiments, which are to be considered to be illustrative only, and non-limiting.

EXAMPLE 1

Ninety-eight parts by weight of trioxane and 2 parts by weight of ethylene oxide, 0.01% by weight of polydimethyl siloxane diglycidyl ether having glycidyl groups at both terminals thereof (number average polymerization degree approx. 25were added together and heated to 65° C. with proper stirring. Subsequently, the polymerization was carried out at a temperature between $60^\circ \sim 100^\circ$ C., with a specified amount of boron trifluoride ethyl ether complex added.

With proceeding polymerization, the system became cloudy and solidified, and 40 minutes later the reaction was stopped by adding an aqueous solution of alcohol containing a small amount of triethyl amine. The product was pulverized, thrown into acetone (to which a small amount of triethyl amine was further added) to be well cleaned, followed by drying in air.

The resulting polymer had a melt index of 5.0 and a melting point of 168° C.

EXAMPLE 2

The same operation as that of Example 1 was employed, except that, as a both terminals reactive silicon oil, use was made of 3% by weight, in proportion to total monomers, of polydimethyl siloxane diglycidyl ether having glycidyl groups at both terminals (number average polymerization degree approx. 50), which yielded a silicon containing polyacetal copolymer with a melt index of 2.0 and a melting point of 165° C.

EXAMPLE 3

A silicon containing polyacetal copolymer with a melt index of 2.0 and a melting point of 165° C. was obtained by utilizing the same operation as in Example 1 and 2, except that use was made of 3% by weight, in proportion to total monomers, of polydimethyl siloxane monoglycidyl ether (number average polymerization degree approx. 500 ) with its one terminal (X) being a methyl group, as a terminal reactive silicone oil.

EXAMPLE 4

A silicon containing polyacetal copolymer with a melt index of 15 and a melting point of 115° C. was obtained by performing the same operation as in Example 3, using 10% by weight of the silicone oil used in Example 3, on the basis of total monomers.

EXAMPLE 5

A silicon containing polyacetal copolymer with a melt index of 20.5 and a melting point of 151° C. was obtained by using the same operation as in the other embodiments, using as a terminal reactive silicone oil 20% by weight, on the basis of total monomers of polydimethyl siloxane monoglycidyl ether (number average polymerization degree approx. 300) with one terminal (X) being —OCH₃.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Silicone oil (% by weight) | 0.01 | 3 | 3 | 10 | 20 | — | (3)* | (3)** |
| Tensile properties | | | | | | | | |
| Rupture strength (kg/cm²) | 630 | 650 | 600 | 530 | 480 | 620 | 615 | 520 |
| Rupture elongation (%) | 70 | 75 | 95 | 120 | 180 | 60 | 62 | 45 |
| Impact resistance test Izod impact strength (kg/cm²) (with notch, on the notch side) | 8.1 | 9.0 | 8.5 | 9.8 | 12.1 | 6.5 | 6.3 | 4.8 |
| Coefficients of dynamic friction | | | | | | | | |
| on steel | 0.12 | 0.10 | 0.10 | 0.10 | 0.10 | 0.15 | 0.15 | 0.11 |
| on polyacetal | 0.25 | 0.21 | 0.20 | 0.18 | 0.18 | 0.35 | 0.33 | 0.19 |
| Water absorbency (%) When dipped at 23° C. for 24 hours | 0.16 | 0.09 | 0.11 | 0.05 | 0.05 | 0.25 | 0.23 | 0.20 |

*Silicone oil was used with both terminals being methyl groups.
**A composition having the same merely mixed therein.

COMPARATIVE EXAMPLE 1

A polyacetal copolymer with a melt index of 5.5 and a melting point of 168° C. was obtained by polymerization in the same manner as in Example 1, from trioxane and ethylene oxide, without using silicone oil.

COMPARATIVE EXAMPLE 2

A polymer with a melt index of 6.5 and a melting point of 166° C. was obtained by using the same operation as in Example 2, except that use was made of 3% by weight, on the basis of total monomers, of silicone oil with both its terminals being methyl groups (number average polymerization degree approx. 25). However, absorption of the siloxane segment was not recognized from the IR analysis of the film manufactured by the melting this polymer.

COMPARATIVE EXAMPLE 3

A silicone oil containing a polyacetal resin composition was prepared by adding 3% by weight of silicone oil having no glycidyl group at its terminals which was used in Comparative Example 2 to polyacetal copolymer obtained in Comparative Example 1, followed by kneading. It should be noted that a slight bleeding of silicone oil was recognized on the surface of the resin composition.

The polymers obtained in Examples 1~5 and Comparative Examples 1~3 were molded into test pieces which were tested for impact resistance, tensile properties, coefficient of friction and absorbency, etc.

The results are summarily noted in Table 1.

The testing and measuring methods are specified as follows:

(1) Tensile property—ASTM D638.
(2) Impact resistance test—ASTM D256.
(3) Coefficient of dynamic friction (against steel and polyacetal)—ASTM D1894.
(4) Water absorbency—ASTM D 570.

We claim:

1. A silicon-containing polyacetal copolymer which comprises:
   (i) between 0.001 to 50 percent by weight of silicone oil segments derived from a silicone oil of the following formula (A):

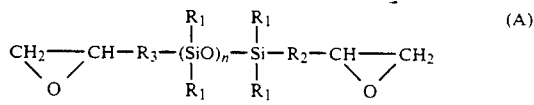

where $R_1$ is an alkyl or phenyl group, $R_2$ and $R_3$ are each a divalent organic group, and n is a number between 5-1000, and
   (ii) between 50 to 99.999 percent by weight of polyacetal segments covalently bonded to said silicone oil segments derived from either (a) trioxane, or (b) a mixture of trioxane and a comonomer copolymerizable therewith.

2. A silicon-containing polyacetal copolymer according to claim 1, wherein said polyacetal segments are selected from the group consisting of polyoxymethylene homopolymer derived solely from trioxane, and polyoxymethylene copolymers having a skeleton comprised mainly of oxymethylene units derived from trioxane, and at least one comonomer selected from the group consisting of ethylene oxide, propylene oxide, oxetane, dioxorane, dioxepane, trioxepane and butane diol formal.

3. A silicon-containing polyacetal copolymer according to claim 1 or 2, wherein $R_1$ in formula (A) is a methyl group.

4. A method of manufacturing a silicon-containing polyacetal copolymer comprising copolymerizing, by heating at a temperature between 60° C. and 150° C. in the presence of a trifluoroboron or a trifluoroboron complex catalyst, (a) trioxane, or (b) a mixture of trioxane and a comonomer copolymerizable therewith, an an epoxy-terminal reactive silicone oil represented by the following formula (A):

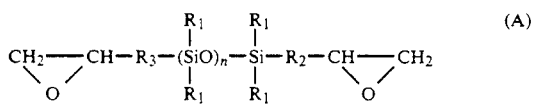

where $R_1$ is an alkyl or phenyl group. $R_2$ and $R_3$ are each a divalent organic group, and n is a number between 5–1000.

5. A method of manufacturing a silicon-containing polyacetal copolymer according to claim 4, wherein a mixture of trioxane and a comonomer copolymerizable therewith is copolymerized with the epoxy-terminal reactive silicone oil represented by the formula (A), and wherein said comonomer is at least one selected from the group consisting of ethylene oxide, propylene oxide, oxetane, dioxolane, dioxepane, trioxepane, and butanediol formal.

6. A method of manufacturing a silicon-containing polyacetal copolymer according to claim 4 or 5, wherein $R_1$ in formula (A) is a methyl group.

* * * * *